United States Patent
Friedman et al.

(10) Patent No.: US 7,454,435 B2
(45) Date of Patent: Nov. 18, 2008

(54) SYSTEMS AND METHODS FOR GRANULAR CHANGES WITHIN A DATA STORAGE SYSTEM

(75) Inventors: Gregory S. Friedman, Redmond, WA (US); Richard L. Negrin, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 327 days.

(21) Appl. No.: 11/121,218

(22) Filed: May 3, 2005

(65) Prior Publication Data

US 2006/0253470 A1 Nov. 9, 2006

(51) Int. Cl.
*G06F 17/03* (2006.01)

(52) U.S. Cl. .............. 707/102; 707/101; 707/200; 707/4; 709/221

(58) Field of Classification Search .......... 707/2, 707/3, 7, 10, 100, 104; 705/26
See application file for complete search history.

(56) References Cited

U.S. PATENT DOCUMENTS

| | | | | |
|---|---|---|---|---|
| 6,058,391 A | * | 5/2000 | Gardner | 707/4 |
| 6,823,376 B1 | * | 11/2004 | George et al. | 709/221 |
| 7,117,225 B2 | * | 10/2006 | Cosic | 707/102 |
| 2001/0051949 A1 | * | 12/2001 | Carey et al. | 707/103 R |
| 2002/0023097 A1 | * | 2/2002 | Ripley | 707/200 |
| 2003/0018652 A1 | | 1/2003 | Heckerman et al. | |
| 2003/0078934 A1 | | 4/2003 | Cappellucci et al. | |
| 2003/0140308 A1 | * | 7/2003 | Murthy et al. | 715/500 |
| 2003/0158846 A1 | * | 8/2003 | Ikehata et al. | 707/7 |
| 2003/0195885 A1 | | 10/2003 | Emmick et al. | |
| 2004/0181543 A1 | * | 9/2004 | Wu et al. | 707/102 |
| 2004/0243593 A1 | * | 12/2004 | Stolte et al. | 707/100 |
| 2005/0080807 A1 | * | 4/2005 | Beilinson et al. | 707/102 |
| 2005/0086239 A1 | * | 4/2005 | Swann et al. | 707/100 |
| 2005/0114331 A1 | * | 5/2005 | Wang et al. | 707/6 |
| 2006/0242104 A1 | * | 10/2006 | Ellis et al. | 707/1 |
| 2006/0248128 A1 | * | 11/2006 | Acharya et al. | 707/203 |

OTHER PUBLICATIONS

International Search Report dated Oct. 19, 2007 for PCT Application Serial No. PCT/US06/08273, 7 Pages.

* cited by examiner

*Primary Examiner*—Jean M. Corrielus
*Assistant Examiner*—Loan T Nguyen
(74) *Attorney, Agent, or Firm*—Amin, Turocy & Calvin, LLP

(57) ABSTRACT

The subject invention provides a system and/or a method that facilitates creating a data structure to provide a proportional data change. The data change is associated to hierarchical data that can represent a database-based file storage system. An interface can receive at least one data change input related to a target within the hierarchical data. In addition, a change definition component can build the data structure to provide a granular update to the target which is proportional to a data change input.

11 Claims, 10 Drawing Sheets

SYSTEMS AND METHODS FOR GRANULAR CHANGES WITHIN A DATA STORAGE SYSTEM

TECHNICAL FIELD

The present invention generally relates to databases and more particularly to systems and/or methods that facilitate providing a data change within hierarchical data.

BACKGROUND OF THE INVENTION

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that facilitates user friendly and quick data searches and retrieval. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Also, the tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. Database applications allow the user to compare, sort, order, merge, separate and interconnect the data, so that useful information can be generated from the data. Capacity and versatility of databases have grown incredibly to allow virtually endless storage capacity utilizing databases. However, typical database systems offer limited query-ability based upon time, file extension, location, and size. For example, in order to search the vast amounts of data associated to a database, a typical search is limited to a file name, a file size, a date of creation, etc., wherein such techniques are deficient and inept.

With a continuing and increasing creation of data from end-users, the problems and difficulties surrounding finding, relating, manipulating, and storing such data is escalating. End-users write documents, store photos, rip music from compact discs, receive email, retain copies of sent email, etc. For example, in the simple process of creating a music compact disc, the end-user can create megabytes of data. Ripping the music from the compact disc, converting the file to a suitable format, creating a jewel case cover, and designing a compact disc label, all require the creation of data.

Not only are the complications surrounding users, but developers have similar issues with data. Developers create and write a myriad of applications varying from personal applications to highly developed enterprise applications. While creating and/or developing, developers frequently, if not always, gather data. When obtaining such data, the data needs to be stored. In other words, the problems and difficulties surrounding finding, relating, manipulating, and storing data affect both the developer and the end user.

In particular, data manipulations can be costly and/or expensive based at least in part upon a system resource. Previous approaches for implementing a data input change required the bringing of an entire object and/or data out of storage and/or memory, update the change(s) and pass the entire object and/or data back into storage and/or memory. Such technique is inefficient and expensive to move data across server-client boundaries. With the vast amounts of data and numerous data manipulations, conserving resources associated with database systems and/or file storage systems is a growing concern.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate data manipulation in relation to hierarchical data. The hierarchical data can be any data that is structured hierarchically containing at least one of a sub-class and/or a super-class, which can also include extensible markup language (XML) and data associated with a database-based file storage system, wherein information is represented as complex instances of types. A change definition component can create and/or build a data structure (e.g., hierarchical tree structure) that represents set of data changes to be incorporated into the hierarchical data. The employment of the data structure allows granular update of data within the hierarchical data. The cost of the update, in terms of utilization of system resources, is proportional to the amount of data that is updated. Furthermore, the change definition component can provide a granular update to a particular property associated to an object within the hierarchical data as well as replacing the entire object.

In accordance with one aspect of the subject invention, the change definition component can include a tree component that provides the description of a data change input. The tree component can utilize at least one of an assignment node and a traversal node that provides a granular update to a target within the hierarchical data. Furthermore, the change definition component can include an assignment component that utilizes an assignment value list to provide values that can correspond to the data change input to be applied to the target within the hierarchical data. Moreover, the change definition component can further include a compile component that facilitates compiling the data structure into a more compact form.

In accordance with another aspect of the subject invention, an unpack component provides a transformation to an in-memory object. In addition, the unpack component can translate a compiled data structure into a structured query language (SQL) and/or unpack a compiled data structure to allow the application of the granular change. The unpack component can further employ a verify component to provide verification of the data structure. Such verification can include structural verification and/or verification of the description of at least one of a property, a path, and/or a type. Moreover, a security component can be employed to provide security in relation to data change input(s). The security component can provide security techniques wherein a data change and/or granular update can correspond to a security level to provide protection against any unsecured data manipulations. In other aspects of the subject invention, methods are provided that facilitate manipulating data while conforming to a data model.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

APPENDICES

Figure 1:
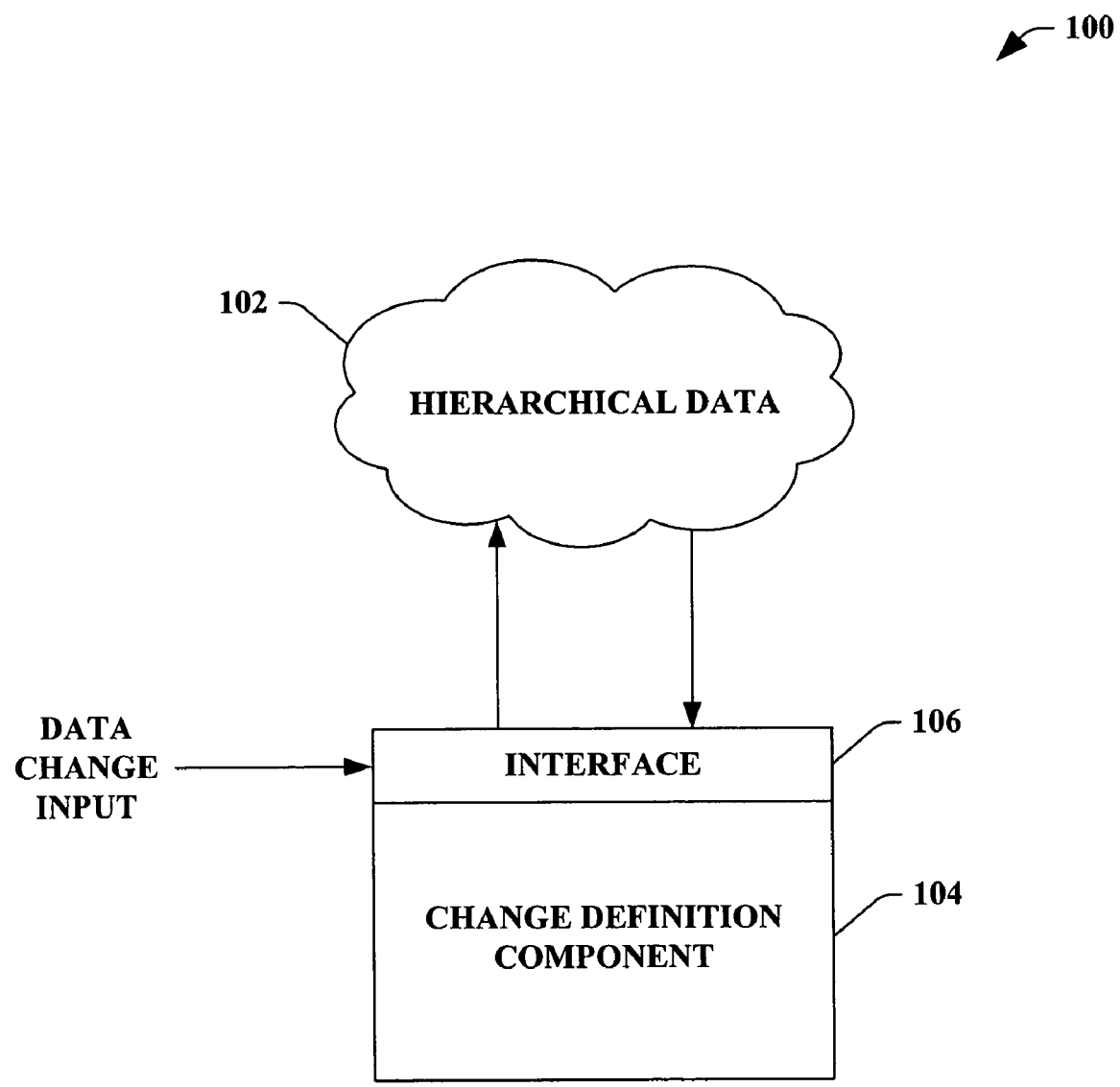
FIG. 1 illustrates a block diagram of an exemplary system that facilitates providing a data change in relation to hierarchical data.

Appendix A provides an example of a Change Definition description. Appendix A is incorporated herein and is to be considered part of the application.

DESCRIPTION OF THE INVENTION

As utilized in this application, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Now turning to the figures, FIG. 1 illustrates a system 100 that facilitates providing a data change to hierarchical data. Hierarchical data 102 can be data that is structured hierarchically containing at least one of a sub-class and/or a super-class. The hierarchical data 102 can be, but is not limited to, extensible markup language (XML), an object, data within a database-based file storage system, etc. A change definition component 104 can provide an operation in relation to a data change input associated with the hierarchical data. For example, a data change input can be a change to a property within an object. In other words, the change definition component 104 can allow granular modifications, thus keeping the size of an operation proportional to the size of the data changed. It is to be appreciated and understood that the change definition component 104 can provide a granular change to any suitable hierarchical data to increase efficiency and/or system resources.

For example, the change definition component 104 can invoke a change definition data structure that can be employed to facilitate modifying hierarchical data. The change definition component 104 can create a data structure (e.g., hierarchical tree structure) that represents any data change to be incorporated into the hierarchical data 102. For instance, a developer can package a set of changes to apply to a specific instance of hierarchical data, wherein the package can be unpacked and applied in a performant manner. It is to be appreciated and understood that the package can be passed to a process, a machine, and/or a combination thereof.

In one example, the hierarchical data can be associated with a data storage system (e.g., a database-based storage system) that utilizes at least one database structure, wherein an item, a sub-item, a property, and a relationship are defined to allow representation of information within a data storage system as instances of complex types. The data storage system can employ a set of basic building blocks for creating and managing rich, persisted objects and links between objects. An item can be defined as the smallest unit of consistency within the data storage system, which can be independently secured, serialized, synchronized, copied, backup/restored, etc. The item is an instance of a type, wherein all items in the data storage system can be stored in a single global extent of items. The data storage system can be based upon at least one item and/or a container structure. For example, an item within the data storage system can have various properties, wherein a data change (e.g., a name update, a value update, a deletion of a property, etc.) to a property can be invoked. Rather than replacing the entire item to update the single property change, the change definition component 104 can provide a granular change to the item, wherein the property is updated with the new value.

The system 100 further includes an interface component 106, which provides various adapters, connectors, channels, communication paths, etc. to integrate the change definition component 104 into virtually any operating and/or database system(s). In addition, the interface component 106 can provide various adapters, connectors, channels, communication paths, etc. that provide for interaction with data and the change definition component 104. It is to be appreciated that although the interface component 106 is incorporated into the change definition component 104, such implementation is not so limited. For instance, the interface component 106 can be a stand-alone component to receive or transmit the data in relation to the system 100.

Figure 2:
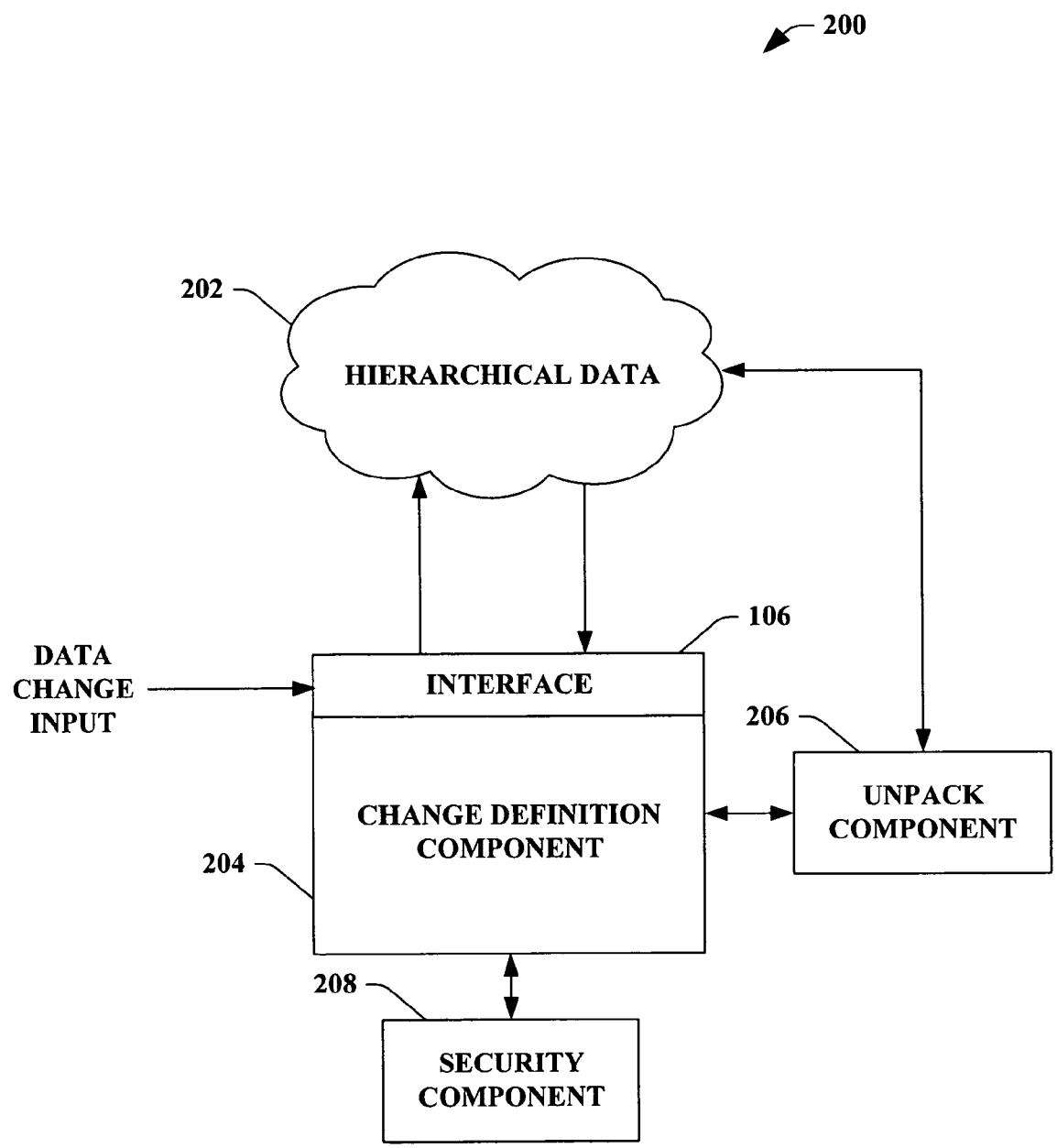
FIG. 2 illustrates a block diagram of an exemplary system that facilitates employing a data change to hierarchical data that allows the conservation of resources.

FIG. 2 illustrates a system 200 that facilitates employing a data change to hierarchical data that allows the conservation of resources to enact such change. Hierarchical data 202 can be any suitable data that is structured in a hierarchical manner. For example, the hierarchical data 202 can be XML, database-based file storage system data, an object, an item within a data storage system containing at least one property, etc. In one particular example, the hierarchical data 202 is data within a data storage system, wherein information is represented as instances of complex types. Such data storage system can describe a shape of data, declare constraints to imply certain semantic consistency on the data, and define semantic associations between the data. Moreover, the data storage system can utilize a set of basic building blocks for creating and managing rich, persisted objects and links between objects.

A change definition component 204 can provide a granular data change in conjunction with hierarchical data 202. The change definition component 204 can invoke a change definition object, wherein the object can include a set of changes to apply to the hierarchical data 202. For example, the set of changes associated to the hierarchical data 202 can be represented by a data structure. The data structure can be a tree that describes the set of changes to be invoked to a target environment (e.g., a target within the hierarchical data). It is to be appreciated and understood that the data structure can have at least one data change and/or value embedded into the tree. Furthermore, the values for the data changes can be in a separate list defined as an assignment value list, wherein the assignment value list contains an index that is mapped to the data changes and/or updates.

For example, the change definition component 204 can provide a change definition instance and/or object that represents each property and/or data change utilizing the tree structure where each level in the tree can correspond to a nested level of properties within the object type. A change to a property value can be represented by a leaf node, which can be called an assignment node. The assignment node type is "assignment". These nodes can represent an assignment to a property and contain a property name. A non-leaf node (e.g., except a root) can correspond to a nested type that is a member of either top level property or another nested type property. This non-leaf node can be defined as a traversal node. Traversal nodes can include a list of nodes (e.g., assignment or traversal) and optionally a type that is utilized by a store for incorporating an appropriate case. The traversal node type is "pathcomponent".

The data structure and/or tree structure can be packaged in a terse, performant, and succinct form (e.g., compiled form) and passed to another system, process, and/or machine. Such data structure and/or tree structure can be compiled. In one example, the compiled and/or packaged form can return all the data changes for a respective entity in a format (e.g., binary, hexadecimal, decimal, octal, etc.). The compiled and/or packaged form can be applied to an in-memory object. Moreover, the compiled and/or packaged form can be translated to a nested structured query language (SQL) update statement. For instance, the format (e.g., binary) can be parsed and matched with a value list to build an update statement. Additionally, the binary form can be translated into a transact-SQL (T-SQL) batch (e.g., batch is a program that can be executed). It is to be appreciated that the binary form can be transformed into any suitable executable form.

An unpack component 206 can receive the packaged set of changes. The unpack component can unpack and apply the compiled and/or packaged form of the data structure to a target within the hierarchical data 202. For example, the data structure can be a binary form tree that includes at least one of the assignment node and/or a traversal node. The unpack component 206 can analyze the compiled and/or packaged form of the set of changes (e.g., having at least one change to data) and incorporate the change accordingly. It is to be appreciated that the unpack component 206 can target a granular property related to the hierarchical data 202 such that the cost of the data change operation is proportional to the amount of data change to be implemented. Although the unpack component 206 is illustrated as a separate component, it is to be appreciated and understood that such component can be incorporated into the change definition component, incorporated into the hierarchical data, be a separate process, a separate machine, and/or any combination thereof.

The change definition component 204 can further utilize a security component 208 to provide at least one security attribute to the system 200. For instance, the security component 208 can utilize a user profile such that particular data change and/or techniques are associated therewith. Furthermore, the security component 208 can utilize various security measures such as, but not limited to, a login, a password, biometric indicia (e.g., a fingerprint, a retinal scan, inductance, . . . ), voice recognition, etc. to ensure the integrity and validity of a particular user incorporating a change to the hierarchical data 202 via the change definition component 204. The security component 208 can further employ any suitable security attribute associated to the hierarchical data 202.

Figure 3:
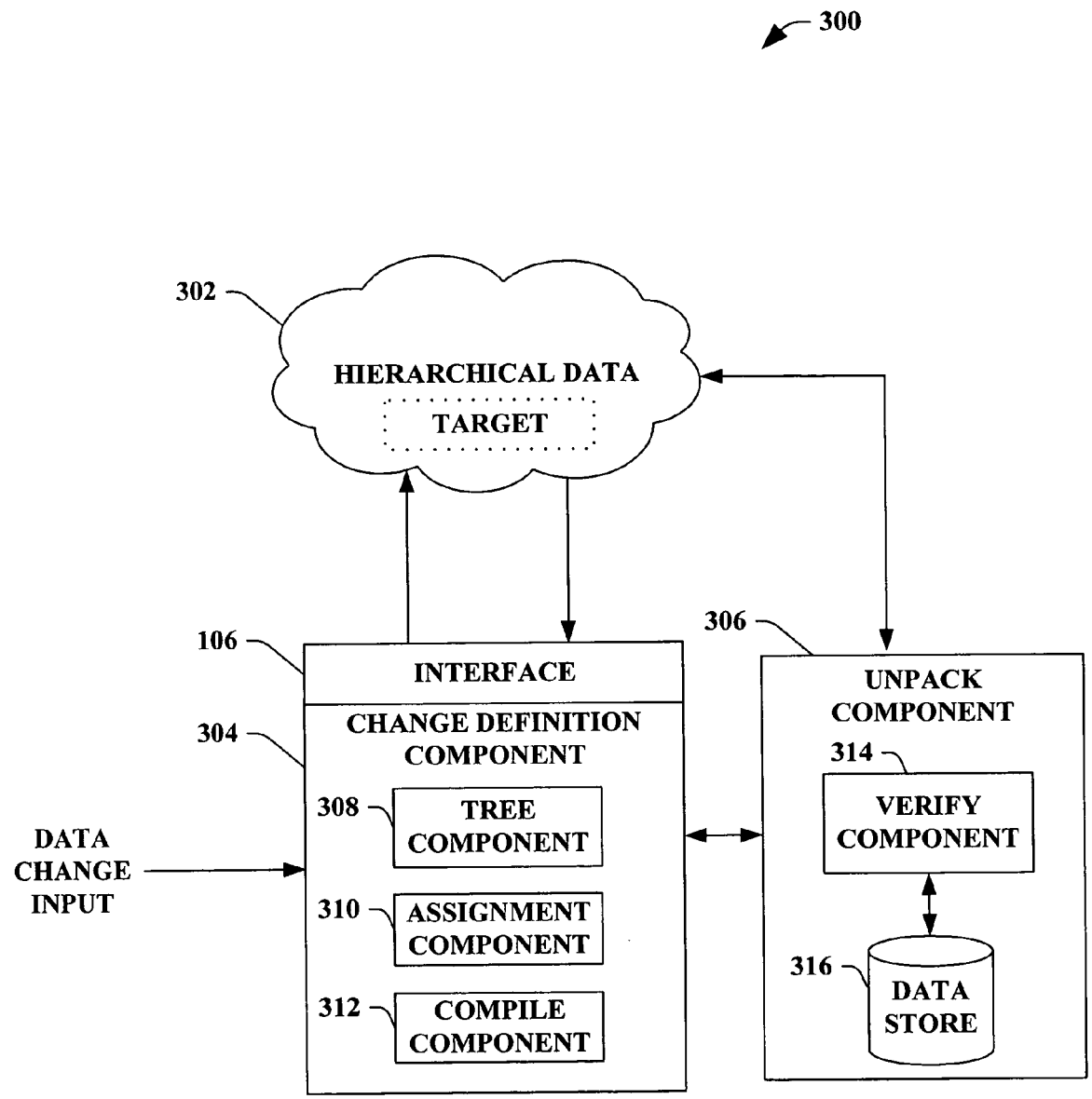
FIG. 3 illustrates a block diagram of an exemplary system that facilitates creating a change definition object to provide a data change to a target within hierarchical data.

FIG. 3 illustrates a system 300 that facilitates creating a change definition object to provide a proportional data change to a target within hierarchical data. Hierarchical data 302 can be data that is structured hierarchically containing at least one of a sub-class and/or a super-class. The hierarchical data 302 can be, but is not limited to, extensible markup language (XML), an object, data within a database-based file storage system, at least one object within a data storage system that represents information as instances of complex types, etc. The hierarchical data 302 can include a target, wherein the target can be a specific instance to which a change of data is to be implemented. For instance, a class can include various properties associated therewith. In such example, the target can be a particular property and/or properties that are to be changed. It is to be appreciated that the data change is not limited to a property and that any suitable data change can be utilized with the subject invention. In other words, the data change can be, but is not limited to, a property, a collection of properties, an entire object, etc. It is to be understood that the hierarchical data 302 can be substantially similar to the hierarchical data 202 and 102 in FIGS. 2 and 1 respectively.

A change definition component 304 can facilitate providing a granular update such that a system resource is conserved and utilized efficiently. For example, a data change can be a change to a property within an object. In other words, the change definition component 204 can invoke granular modifications, thus keeping the size of an operation proportional to the size of the data changed such that system resources are efficiently conserved. The change definition component 304 can receive at least one data change input from which a data structure can be implemented to incorporate the data change to the hierarchical data 302 and, in particular, the target therein. It is to be appreciated that the change definition component 304 can be substantially similar to the change definition component 204 and 104 in FIGS. 2 and 1 respectively.

The change definition component 304 can further include a tree component 308 that facilitates creating a data structure in a tree format to represent the at least one data change to incorporate to the target within the hierarchical data 302. In one example, the data structure can be a tree structure utilizing at least one of an assignment node and a traversal node. A change to a target (e.g., a property value) within the hierarchical data 302 can be represented by a leaf node, which can be referred to as the assignment node. The assignment node type is assignment, wherein these nodes can represent an assignment to a property and contain a property name related to the target. The non-leaf nodes can represent a nested type that is a member of either a top level property and/or another nested type property, which is called a traversal node. The traversal node can contain a list of nodes (e.g., an assignment node, a traversal node, . . . ) and optionally a type that is utilized by a store for doing an appropriate cast. The traversal node type is path component. Such nodes can represent a set of changes, wherein the data structure and/or tree structure can be packaged and/or compiled. It is to be appreciated and understood that the tree component 308 can analyze a data change input and create a corresponding data structure to implement a data change to the target within the hierarchical data 302.

The tree component 308 can build a data structure by creating traversal and assignment nodes. The data structure can relate to, but is not limited to, the data change input. For instance, the nodes can be added by the ChangeDefinition, wherein a ChangeDefinition class utilizes methods for creating nodes and walking the data structure and/or tree. An example of the Change Definition class (also referred to as ChangeDefinition class) is illustrated in APPENDIX A. In one example, the following are defined assignment types: 1) assign a scalar value at a depth; 2) assign a nested type instance at a depth; and 3) assign a collection (e.g., multiset and/or sqlList) at a depth. It is to be appreciated and understood that scalar properties (e.g., XML and FileStream properties) can be replaced. In another example, such scalar properties are partially updated.

The change definition component 304 can include an assignment component 310 that utilizes an assignment value list to provide values that correspond to the data change(s) to implement to the target within hierarchical data 302. The assignment component 310 can build a list of values that correspond to the data changes to be applied to the target. It is to be appreciated that the assignment component 310 can re-use a data structure that has been created to provide a granular update when only the assignment values are changed. In one example, the assignment component 310 can utilize an assignment value list. The data structure can include an assignment node, wherein an index can be assigned therewith. The index can be equal to n−1, wherein n is the number of insertions into the data structure (e.g., the tree with at least one of an assignment node and/or a traversal node). For example, the first assignment node gets index zero, the second assignment node gets index one, etc. The index can also be returned to a caller of the function that allows the addition of an assignment. An assignment value object can be created by the assignment component 310 that contains the value of the property added to the data structure and/or tree. The assignment value can be added to the assignment value list such that the location in the assignment value list maps to the index in the assignment node of the data structure and/or tree.

In one example, the assignment node can be added to the data structure and/or tree, and add the corresponding assignment value object to the assignment value list. In other words, the assignment value object can be appended to the end of the assignment value list. The resulting assignment value list is the value that is passed in for the value list parameter. It is to be appreciated that the assignment value list, assignment value object, and the index is one example and that the subject invention is not limited to such techniques.

The change definition component 304 can include a compile component 312 to compile the data structure and provide a packaged set of at least one change to invoke to the target within the hierarchical data 302. The data structure can be compiled and/or packaged into a format, wherein the format can be, but is not limited to, a binary string, a hexadecimal format, an octal format, etc. The compile component 312 can return a description of properties that can be changed in a binary format (e.g., also referred to as a compiled change definition). In one example, the value can be passed in as the changeDefinition parameter in any suitable update method.

An unpack component 306 can provide the unpacking and/or application of the marshaled set of changes represented by the data structure and/or tree. The unpack component 306 can be a separate process, machine, and/or any combination thereof to provide the unpacking and/or incorporation of the data changes to the target within the hierarchical data 302. The unpack component 306 can receive the compiled change definition and assignment value list to update the target. It is to be appreciated that the unpack component 306 can utilize target identifying information in order to determine the location of the target within the hierarchical data 302. The compiled and/or packaged form can be applied to an in-memory object. Moreover, the compiled and/or packaged form can be translated to a nested structured query language (SQL) update statement. For instance, the format (e.g., binary) can be parsed and matched with a value list to build an update statement. Additionally, the binary form can be translated into a transact-SQL (T-SQL) batch (e.g., batch is a program that can be executed).

The unpack component 306 can include a verify component 314 to authenticate at least one data change associated with the target within the hierarchical data 302. For example, the data structure that represents the data change can be structurally invalid (e.g., corrupted, crash-prone, etc.). In another example, the form of the data structure can be valid, yet it may describe invalid properties, paths, and/or types. The verify component 314 can ensure the data structure and/or tree is in a valid form with valid descriptions. For instance, the verify component 314 can utilize metadata about the type system to validate the structure of the data structure, tree, and/or the compiled change definition. The verify component 314 can also utilize a managed type catalogue, wherein the managed type catalogue can use a dictionary collection. For instance, the catalogue can provide types, base types, properties, and properties' type. In one example, the managed type catalogue can be loaded from a cache table, wherein the caches are populated at schema installation.

Furthermore, the verify component 314 can provide a batch check and/or an error check. In one example, the verify component 314 provides the batch check and/or error check during the translation into a transact-SQL (T-SQL) batch. For example, the following error checks can be employed by the verify component 314: 1) number of assignment values required is consistent with the number provided; 2) index consistency within the compiled change definition; and 3)

type consistency and/or mismatch. It is to be appreciated that the above examples are not to be seen as limiting in accordance with the subject invention.

The unpack component 306 can include a data store 316 to facilitate incorporating a data change to the hierarchical data that is proportional in relation to the change and system resources utilized to apply such change. For instance, the data store 316 can contain metadata associated to the type system, the managed type catalogue, hierarchical data constraints and/or characteristics, etc. The data store 316 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 316 of the subject systems and methods is intended to comprise, without being limited to, these and any other suitable types of memory. In addition, it is to be appreciated that the data store 316 can be a server and/or database.

Figure 4:
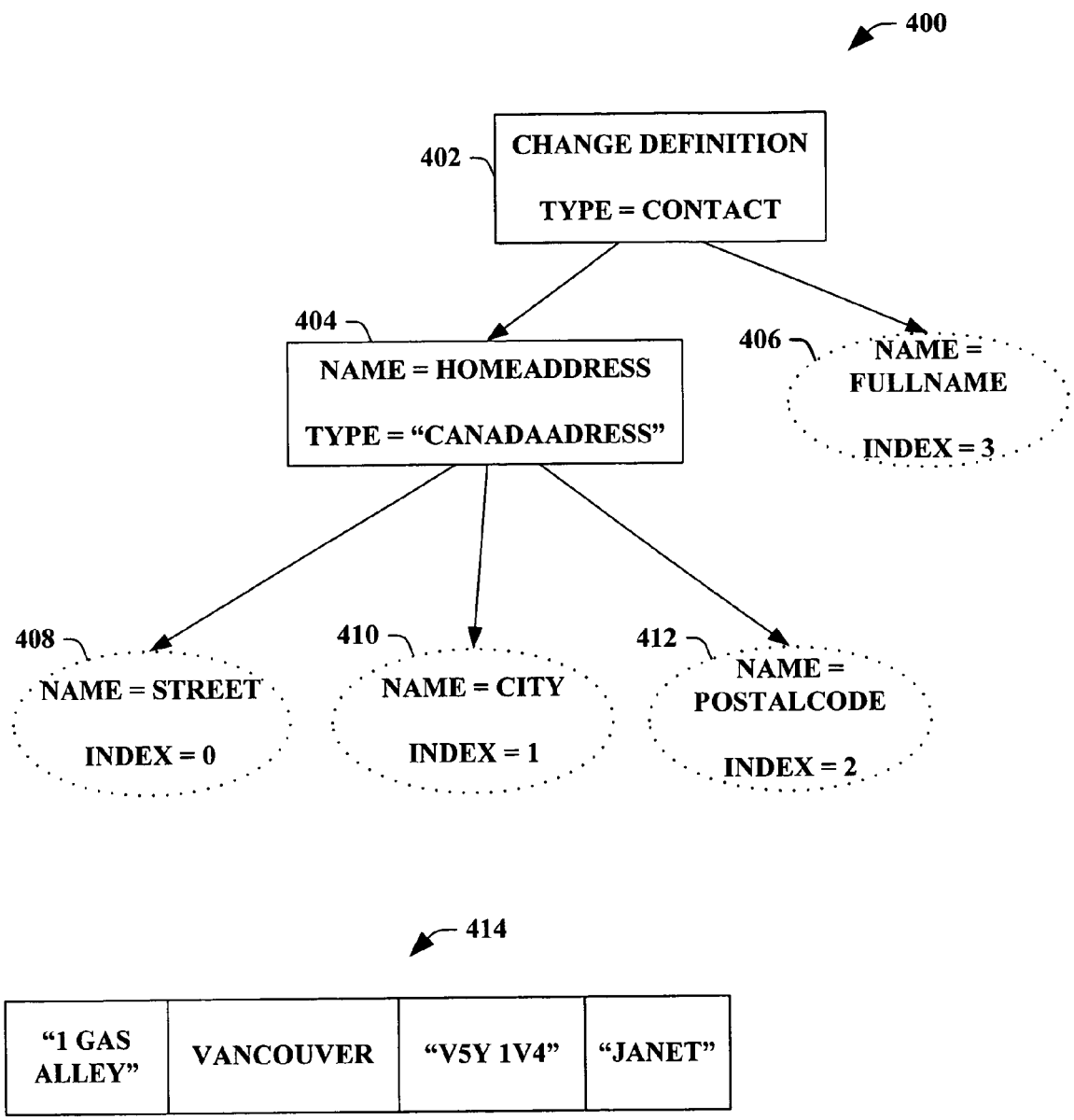
FIG. 4 illustrates a block diagram of a change definition tree structure that can be invoked to provide a data change to hierarchical data.

FIG. 4 illustrates a change definition tree structure 400 that can be invoked to provide a proportional data change to hierarchical data. The following example is to provide clarity in relation to the above aspects of the subject invention and is not to be seen as limiting. Moreover, the example utilizes pseudo code and invocation within a storage relating to hierarchical data within a database-based file storage system that represents information as complex instances of types, wherein such aspects and/or characteristics are not limiting on the subject invention.

A data change input can be represented as code. For example, a developer and/or user can write code to make a change to a store. It is to be appreciated that a store can be defined as a container that is an item containing at least one other item. The containment/store concept is implemented via a container ID property inside the associated class. A store can also be a container such that the store can be a physical organizational and manageability unit. In addition, the store represents a root container for a tree of containers within the hierarchical structure. The following sections illustrate the creation of content in a persistent store and a subsequent granular update to the newly created data.

The following code can be written to first create and persist a "Contact" entity in a persistent storage system.

```
ItemId itemId = new ItemId( );
Contact c = new Contact(itemId);
c.FullName = "Janet";
c.HomeAddress = new CanadaAddress( );
c.HomeAddress.Street = "22 Broad Street";
c.HomeAddress.City = "Whidbey";
((CanadaAddress)(c.HomeAddress)).PostalCode = "X5Y1V4";
// ... additional values may be set as appropriate
```

Once the entity has been created, the entity can be stored using a method exposed by the storage system as in the following code:

```
using (SqlCommand cmd = SqlContext.GetCommand( ))
{
    cmd.CommandText = "[System.Storage.Store].CreateItem";
    cmd.CommandType = CommandType.StoredProcedure;
    cmd.Parameters.Add("@item", SqlDbType. Udt).Value = c;
    SqlHelper.ExecuteCmdNonQuery(cmd, 0);
}
```

Assume now that the developer wishes to make the following set of property changes to the contact:

```
Contact.FirstName <= Janet
Contact.HomeAddress.Street <= 1 Gas Alley
Contact.HomeAddress.City <= Vancouver
Contact.HomeAddress.PostalCode <= V5Y1V4 (treating home
address as a "CanadaAddress", which is a specialized type which extends
its parent type to include a PostalCode)
```

In order to make these changes, the change definition tree structure 400 can be built that includes various traversal nodes and assignment nodes. A traversal node 402 can be of type "Contact." The data structure can then branch to include 1) a traversal node 404 (e.g., with name HomeAddress of type CanadaAddress); and 2) an assignment node 406 with name being FullName and index being 3. It is to be appreciated and understood the index reference number can be determined by n-1, where n is the number of insertions into the data structure and/or tree. The traversal node 404 can include an assignment node 408 (e.g., with the name Street and index 0), an assignment node 410 (e.g., with name City and index 1), and an assignment node 412 (e.g., with name PostalCode and index 2). Furthermore, an assignment value list 414 can contain the values that are to be applied to the target. The values can be listed in order based at least in part upon the index number (e.g., index 0="1 Gas Valley," index 1=Vancouver, index 3="V5Y1V4," and index 4="Janet") as shown. In this example, a caller (e.g., a developer, an API, a user, etc.) can set one top level scalar property, FullName, and three scalar properties that are nested under the top level property HomeAddress, which is of type Address. It is to be appreciated that the Postal Code field is a member of the type CanadaAddress which derives from Address, therefore cast is needed to make the assignment of the postal code property.

The code to build this data structure and call the method to update the target (e.g., the item) can be similar to the following.

```
ChangeDefinition cd = new
ChangeDefinition("System.Storage.Contact.Store.Person");
AssignmentValueList valueList = new AssignmentValueList( );
PathComponent pc = cd.AddPathComponent("HomeAddress",
"System.Storage.Contact.Store.CanadaAddress");
pc.AddAssignment("Street",
AssignmentValue.AssignmentValueType.Chars);
valueList.Add(new CharsValue(new SqlChars("1 Gas Alley")));
pc.AddAssignment("City",
AssignmentValue.AssignmentValueType.Chars);
valueList.Add(new CharsValue(new SqlChars("Vancouver")));
pc.AddAssignment("PostalCode",
AssignmentValue.AssignmentValueType.Chars);
```

-continued

```
valueList.Add(new CharsValue(new SqlChars("V5Y1V4")));
cd.AddAssignment("Name",
AssignmentValue.AssignmentValueType.Chars);
valueList.Add(new CharsValue(new SqlChars("Janet")));
```

Once the data structure and/or tree are built, it can be compiled (e.g., also referred to as the compiled change definition). The following pseudo code can compile the data structure and/or tree.

```
byte[ ] compiledChangeDefinition;
cd.Compile(out compiledChangeDefinition);
```

The following table illustrates the compiled form of the ChangeDefinition used in the example. Each row in the table describes a binary scalar value. The values of the rows are concatenated in the order specified to produce the final binary compiled form. It is to be appreciated that the following is only an example and the subject invention is not so limited.

| Field Type | Field Value & Comments |
|---|---|
| Version-Id | 1 |
| Entity-Treat-As-Type | "System.Storage.Contact.Store.Person" |
| Total-Assignment-Count | 4 |
| Node-Type | 1 (PathComponent) |
| Property-Name | HomeAddress |
| Has-Treat-AsType | 1 (true) |
| Treat-As-Type | "System.Storage.Contact.Store.CanadaAddress" |
| Node-Type | 2 (Assignment) |
| Property-Name | "Street" |
| Value-Type | 2 (chars) |
| Value-Index | 0 |
| Node-Type | 2 (Assignment) |
| Property-Name | "City" |
| Value-Type | 2 (chars) |
| Value-Index | 1 |
| Node-Type | 2 (Assignment) |
| Property-Name | "PostalCode" |
| Value-Type | 2 (chars) |
| Value-Index | 2 |
| Node-Type | 3 (EndPathComponent - ends HomeAddress node) |
| Node-Type | 2 (Assignment) |
| Property-Name | "Name" |
| Value-Type | 2 (chars) |
| Value-Index | 3 |
| Node-Type | 3 (EndPathComponent - ends ChangeDefinition) |

By following the example and table above, various indexes of field types can be defined. The Version-Id is a 2-byte integer which specifies the version of the compiled change definition form. A server which is asked to process a Change-Definition should reject compiled Change Definitions which specify an unknown Version-Id. The Entity-Treat-As-Type is a length-prefixed Unicode string which describes the type of the entity to which the update should be applied. The Total-Assignment-Count is a 2-byte integer which specifies the total number of assignment nodes, at all depths, present in the ChangeDefinition. Moreover, the Node-Type is a 2-byte integer which specifies the type of the node where the value is one of: 1) The node is of type "PathComponent"; 2) The node is of type "Assignment"; and 3) The node is of type "EndPath-Component" which means that no additional child nodes exist at the current level. A parser which is recursively walking through the compiled change definition form can "bounce up" a level when a node of this type is encountered. The Property-Name is a Length-prefixed Unicode string which specifies the name of the property to assign to or to traverse through. The Value-Type is a 2-byte integer which specifies the type of data being assigned where the value is one of: 1) Guid (globally unique id); 2) Chars (Unicode characters); 3) Bytes (binary data); 4) Boolean; 5) Byte; 6) Int16 (16-bit integer); 7) Int32 (32-bit integer); 8) Int64 (64-bit integer); 9) Single (single-precision floating point); 10) Double (double-precision floating point); 11) Decimal; 12) DateTime; 13)) Inline Type (a nested entity); and 14) MultiSet (a multivalue set of nested entities). The Value-Index is an Index into the associated array of values. The Has-Treat-As-Type is a 1-byte integer which indicates whether or not a PathComponent node specifies an optional "treat as type". Specifying a treat as type instructs the change definition processor to treat the component as a specific subtype of the declared type of the property. A value of "0" indicates that no treat as type is specified, a value of "1" indicates that a treat as type was specified and that the next value in the compiled form is the textual treat as type. The Treat-As-Type is a Length-prefixed Unicode string which specifies the treat as type of the PathComponent node.

Once the data structure and/or tree are compiled, it can be translated to a set of SQL statement that explicitly sets only the properties that have changed. For example, a T-SQL item update method can be passed the compiled change definition and associated values. The T-SQL item update method parses the compiled change definition generates the SQL statements that explicitly update the properties that have changed. It is to be appreciated that various verification and/or authentication techniques can be utilized to verify the structure of the compiled change definition and/or the description of properties, paths, and/or types. For instance, the following pseudo code can be implemented to call the T-SQL method to update an item within hierarchical data.

```
using (SqlCommand cmd = SqlContext.GetCommand( ))
{
    cmd.CommandText = "[System.Storage.Store].UpdateItem";
    cmd.CommandType = CommandType.StoredProcedure;
    cmd.Parameters.Add("@itemId", SqlDbType.UniqueIdentifier).Value = c.getItemId( );
    cmd.Parameters.Add("@compiledChangeDefinition ",
SqlDbType.Udt).Value = compiledChangeDefinition;
    cmd.Parameters.Add("@assignmentValueList ",
SqlDbType.Udt).Value = valueList;
    cmd.Parameters.Add("@promotionStatus", SqlDbType.Int).Value =
somePromotionStatus;
    cmd.Parameters.Add("@syncInfo", SqlDbType.Udt).Value =
SyncVersionInformation.Null;
    cmd.Parameters.Add("@concurrencyToken",
SqlDbType.BigInt).Value = concurrencyToken;
    SqlHelper.ExecuteCmdNonQuery(cmd, 0);
}
```

Once the UpdateItem stored procedure which, in this example, executes in the database process, receives the ChangeDefininition, it can generate a series of TSQL statements which can be executed directly by the database. For the purpose of this illustration, it is necessary to assume the following:

A. The internal database storage schema consists of a storage table called ItemsTable wherein a single column exists called Item.

B. The Item column is declared to contain instances of persisted Item entities including all of the nested content of the Items themselves.

C. Through a process called "Substitution", subtypes of the Item base type, including the Contact type, can be persisted in the column called Items.

D. The TSQL programming language has been extended with grammatical extensions which enable access to the member properties of persisted entities. These extensions include the ability to walk into persisted entities using a "dot" notation. Also, the "TREAT" keyword has been added which specifically the execution engine can treat a persisted type as an instance of a derived type.

E. The TSQL programming language has been extended with the ability to interact with parameters of type "ordered list". In this example, the variable @assignmentValueList is such a parameter, and its members are accessed using an indexor operator ("[index]") which returns the value at the specified index.

In the case of this example, the TSQL generated by UpdateItem may look as follows:

```
UPDATE ItemsTable
SET TREAT(Item AS System.Storage.Contact.Store.Person).(
    TREAT(HomeAddress AS
System.Storage.Contact.Store.CanadaAddress).(
        Street = @assignmentValueList[0],
        City = @assignmentValueList[1],
        PostalCode = @assignmentValueList[2])
    ),
    FullName = @assignmentValueList[3],
)
WHERE Item.ItemId = @itemId
```

The process of transforming the ChangeDefinition into executable TSQL can reference metadata which describes the schema of stored data. Referencing metadata enables the transformation to guarantee that the ChangeDefinition refers only to existing properties of existing types within the storage schema.

It is also possible for the metadata catalog to track a set of constraints and/or restrictions which limit and/or constrain the set of allowable updates. In one example, If, for example, once a Contact's social security number had been set, the database developer desired to make it unmodifiable, the store's metadata describing the contact type could track this "read only" constraint. If a ChangeDefinition were submitted to the store which requested a change to a specific contact's social security number, the system would note that metadata indicated that the property is not writable, and could reject the ChangeDefinition.

Figure 5:
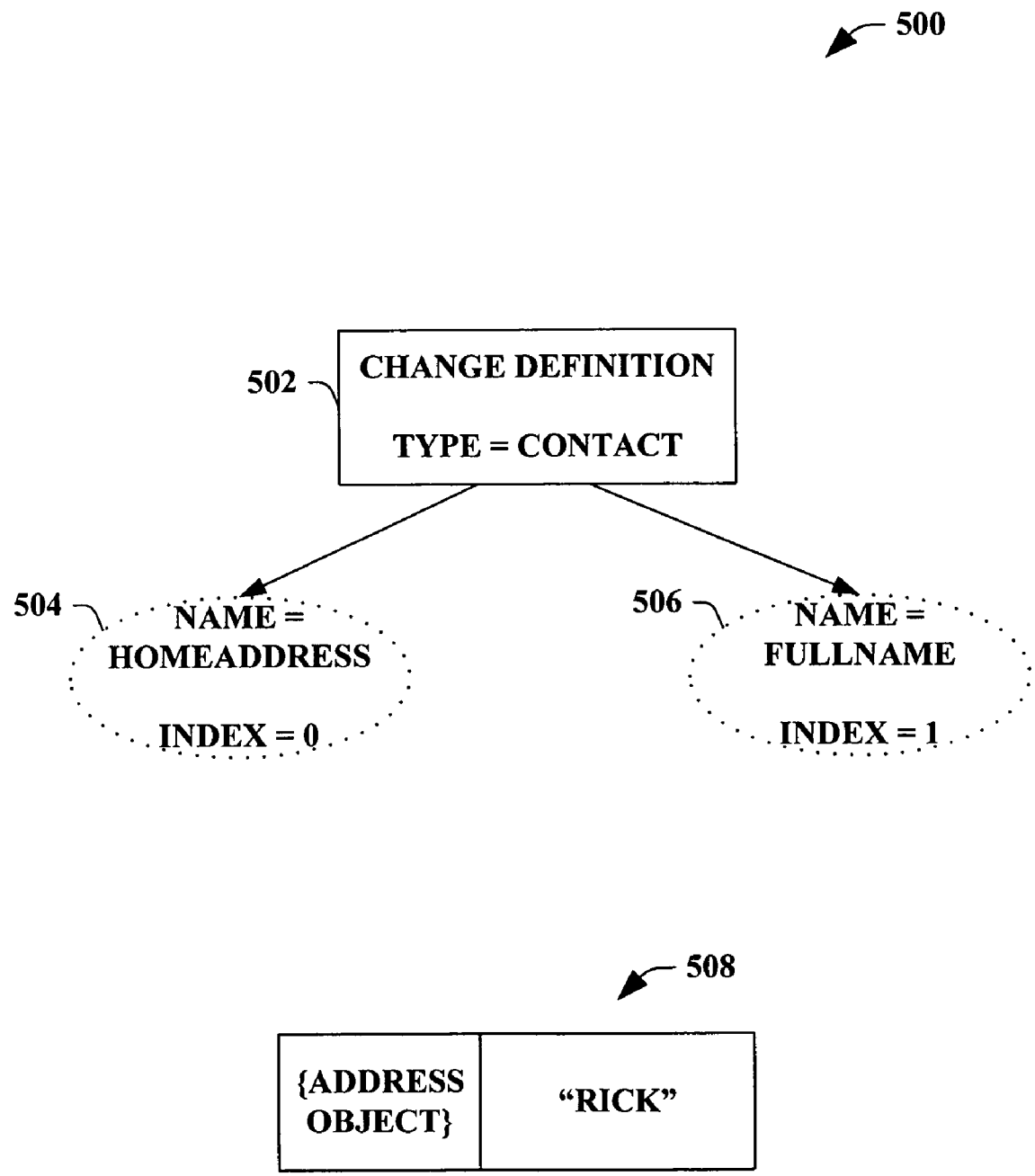
FIG. 5 illustrates a block diagram of a change definition tree structure that provides a data change to hierarchical data.

FIG. 5 illustrates a change definition tree structure 500 that provides a data change to hierarchical data. In addition to modifying a single property on a nested type as in the previous example (See FIG. 4), the subject invention also allows the replacement of an entire nested object and/or collection instance. For example, the entire address object can be replaced by a new address object. It is to be appreciated that the HomeAddress node is an assignment node rather than a traversal node as depicted in the previous example. The following is to be considered as an example and not to be limiting on the subject invention.

The following code can represent a change to an entire nested object and/or collection instance.

```
Contact c = ...;
c.FullName = "Rick";
c.HomeAddress = new Address(...);
```

The change definition tree structure 500 can include a traversal node 502 that is of type Contact. The traversal node 502 can contain an assignment node 504 (e.g., with name being HomeAddress and index 0) and an assignment node 506 (e.g., with name being FullName and index 1). The assignment nodes can have associated values to which the target is to be applied with, wherein an assignment value list 508 can contain values accordingly. Furthermore, the values can correspond to the index number (e.g., index 0={Address Object}, and index 1="Rick").

The following pseudo code can be utilized to build the data structure and call a method to update the item.

```
AssignmentValueList valueList = new AssignmentValueList( );
PathComponent pc = cd.AddNestedTypeAssignment("HomeAddress",
"System.Storage.Contact.Store.Address");
valueList.Add(new NestedTypeValue(someAddress);
cd.AddAssignment("FullName",
AssignmentValue.AssignmentValueType.Chars);
valueList.Add(new CharsValue(new SqlChars("Rick")));
```

Once the data structure and/or tree are built, it can be compiled (e.g., also referred to as the compiled change definition). The following pseudo code can compile the data structure and/or tree.

```
byte[ ] compiledChangeDefinition;
cd.Compile(out compiledChangeDefinition);
```

Once the data structure and/or tree are compiled, it can be translated to a set of SQL statement that explicitly sets only the properties that have changed. It is to be appreciated that various verification and/or authentication techniques can be utilized to verify the structure of the compiled change definition and/or the description of properties, paths, and/or types. For example, the following pseudo code can be implemented to call a T-SQL method to update an item within hierarchical data.

```
using (SqlCommand cmd = SqlContext.GetCommand( ))
{
    cmd.CommandText = "[System.Storage.Store].UpdateItem";
    cmd.CommandType = CommandType.StoredProcedure;
    cmd.Parameters.Add("@itemId",
SqlDbType.UniqueIdentifier).Value = c.getItemId( );
    cmd.Parameters.Add("@compiledChangeDefinition ",
SqlDbType.Udt).Value = compiledChangeDefinition;
    cmd.Parameters.Add("@AssignmentValueList ",
SqlDbType.Udt).Value = valueList;
    cmd.Parameters.Add("@promotionStatus", SqlDbType.Int).Value =
somePromotionStatus;
    cmd.Parameters.Add("@syncInfo", SqlDbType.Udt).Value =
SyncVersionInformation.Null;
    cmd.Parameters.Add("@concurrencyToken",
SqlDbType.BigInt).Value = concurrencyToken;
    SqlHelper.ExecuteCmdNonQuery(cmd, 0);
}
```

Figure 6:
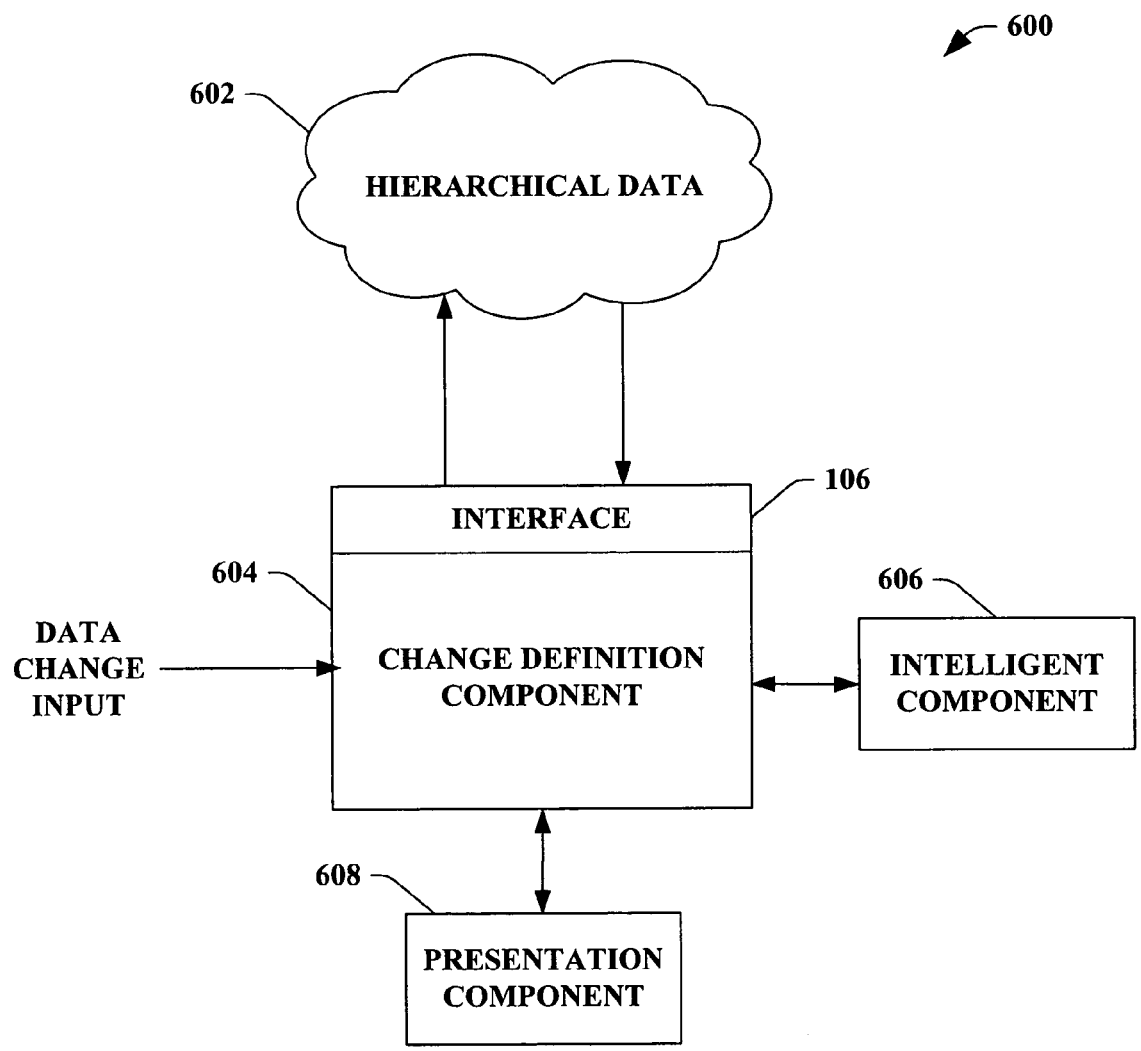
FIG. 6 illustrates a block diagram of an exemplary system that facilitates providing a data manipulation in relation to hierarchical data.

FIG. 6 illustrates a system 600 that employs intelligence to facilitate providing a proportional data manipulation in relation to hierarchical data. Hierarchical data 602 can be data that is structured in a hierarchical format. The hierarchical data 602 can be, but is not limited to, an object, XML, an object within a database-based file storage system, an object within a data storage system, etc. For instance, the data storage system can be a database-based file storage system based at least in part upon a data model, wherein data is represented as instances of complex types. A change definition component 604 can provide a proportional data change to the hierarchical data 602 by utilizing a data structure that can include a tree in a binary form. It is to be appreciated that the hierarchical data 602 and the change definition component 604 can be substantially similar to the hierarchical data 302, 202, and 102, the change definition component 304, 204, and 104 in FIGS. 3, 2, and 1 respectively. The system 600 further includes an intelligent component 606. The intelligent component 606 can be utilized by the change definition component 604 to facilitate providing a proportional data change to the hierarchical data 602. For example, the intelligent component 606 can be utilized to analyze a data change, a data structure representative of a data change, target an entity to apply the data change, etc.

It is to be understood that the intelligent component 606 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the subject invention.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 608 can provide various types of user interfaces to facilitate interaction between a user and any component coupled to the change definition component 604. As depicted, the presentation component 608 is a separate entity that can be utilized with the change definition component 604. However, it is to be appreciated that the presentation component 608 and/or similar view components can be incorporated into the change definition component 604 and/or a stand-alone unit. The presentation component 608 can provide one or more graphical user interfaces (GUIs), command line interfaces, and the like. For example, a GUI can be rendered that provides a user with a region or means to load, import, read, etc. data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the change definition component 604.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In one example, the API can provide data manipulation in conjunction with at least one characteristic and/or constraint associated with the hierarchical data 602. In addition, the command line interface can be employed in connection with hardware (e.g., video cards) and/or displays (e.g., black and white, and EGA) with limited graphic support, and/or low bandwidth communication channels.

Figure 7:
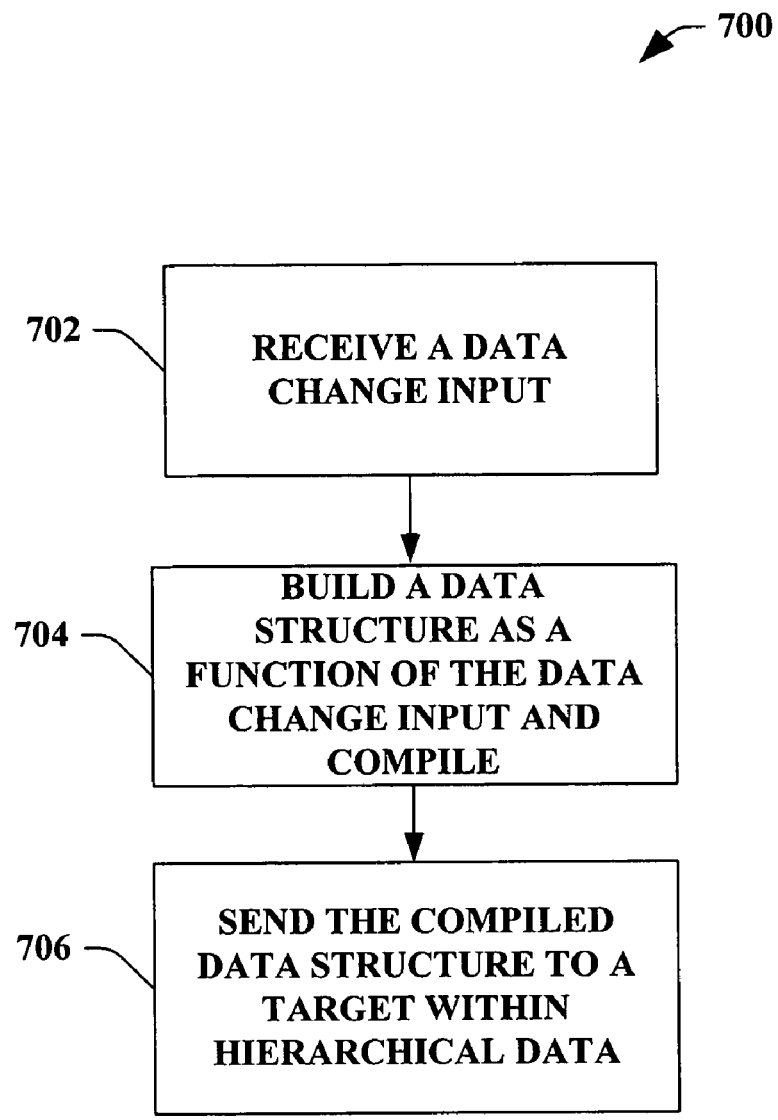
FIG. 7 illustrates an exemplary methodology for providing data change to hierarchical data that is to system resources.
Figure 8:
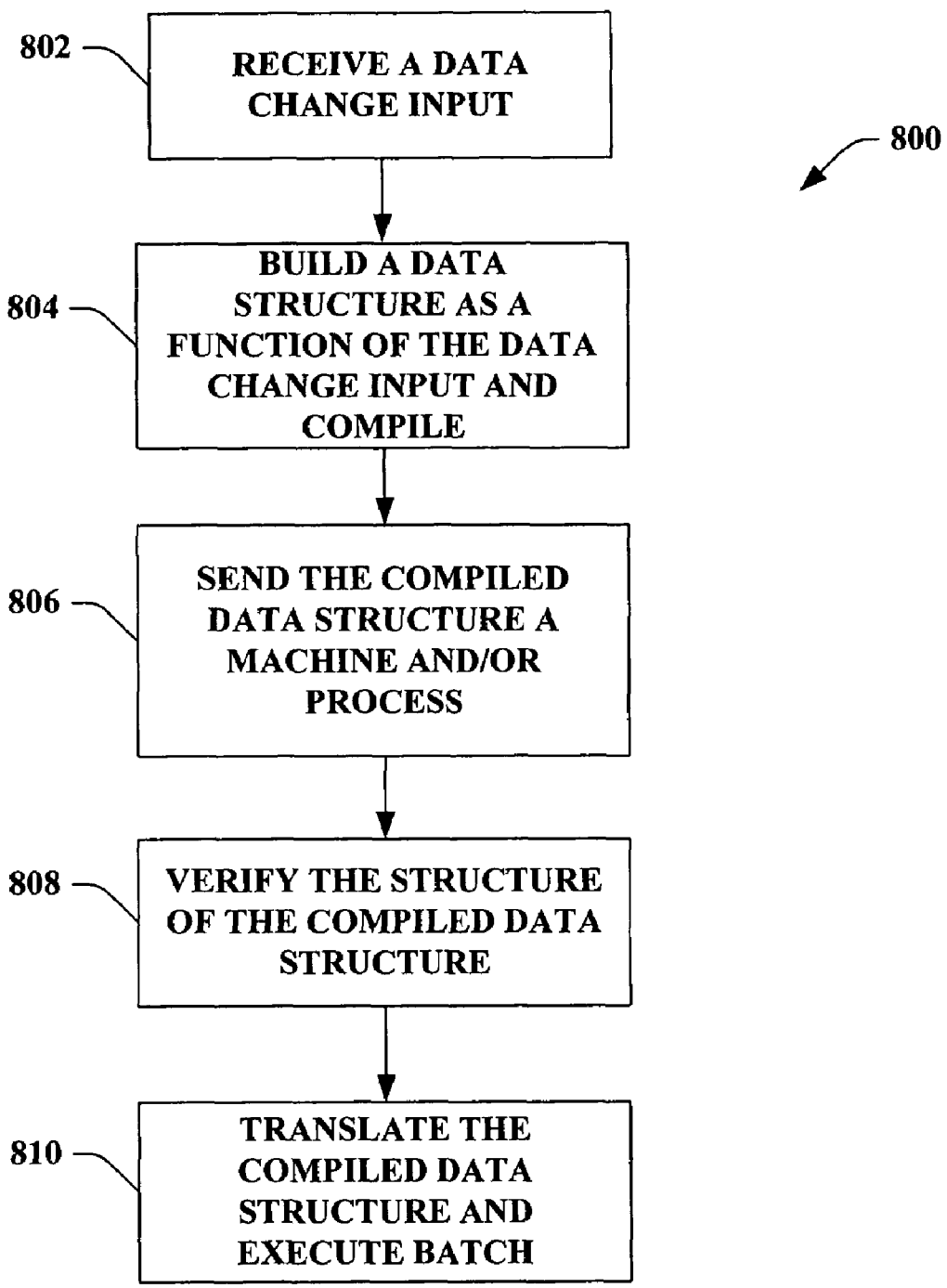
FIG. 8 illustrates an exemplary methodology for creating a data structure that can provide a granular data change to a target within hierarchical data.

FIGS. 7-8 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 7 illustrates a methodology 700 for providing data change to hierarchical data that is proportional to system resources to enact such change. At reference numeral 702, a data change input can be received. The data change input can be received from, for instance, a user, a developer, an application, an API, etc. Moreover, the data change can be a granular change to hierarchical data, wherein the hierarchical data includes XML, an object within a database-based file storage system (e.g., information is represented as complex instances of types). It is to be appreciated that the granular change includes a change to a property associated to an object within the hierarchical data.

At reference numeral 704, a data structure can be built based at least in part upon the data change input. The data structure can be, but is not limited to, a tree structure that includes at least one of an assignment node (e.g., a change to a property value represented by a leaf node) and a traversal node (e.g., non-leaf nodes that represent a nested type that is a member of either top level property or another nested type property). Moreover, the data structure can include an assignment value list containing an index of values to be updated and/or applied to the target. The data structure can include any suitable data change which is represented therewith. Such data structure can be compiled. The compiling of the data structure can return a description of all the properties that will be changed for a target within the hierarchical data in a format (e.g., binary, hexadecimal, octal, etc.). At reference numeral 706, the compiled data structure (also referred to as the compiled change definition) and/or the assignment value list can be sent to a target within the hierarchical data. It is to be appreciated that the compiled change definition can include information to identify the target of the update. For example, the data structure can be compiled and applied to an in-memory object. Additionally, the compiled change definition can be sent to a machine and/or process to unpack and apply in a performant manner.

FIG. 8 illustrates a methodology 800 that facilitates creating a data structure that can provide a granular data change to a target within hierarchical data. At reference numeral 802, a data change input can be received. The data change input can be a change to hierarchical data (e.g., XML, database-based file storage system data, an object, an item within a data storage system containing at least one property, etc.). At reference numeral 804, a data structure and/or tree structure can be built as a function of the data change input and compiled. The data structure and/or tree structure can include at least one of an assignment node and a traversal node. By utilizing such data structure, a data change can be invoked that is proportional to the conservation of system resources to enact such change.

At reference numeral 806, the compiled data structure (also referred to as the compiled change definition) can be sent to, for example, a machine, a process, and/or a separate component. Continuing at reference 808, the data structure can be verified structurally and/or for form. In other words, the compiled form can be verified for structure (e.g., corrupted, crash prone, etc.) and/or for the description of valid properties, paths and/or types. It is to be appreciated that a separate machine, process, and/or component can verify the compiled data structure in order to mitigate system resources. At reference numeral 810, the compiled change definition can be translated into SQL update statement. In particular, the compiled binary string can be parsed to build a T-SQL batch statement (e.g., wherein batch is a program that can be executed). Such batch statement can then be executed in order to provide a proportional data change to the target within the hierarchical data.

Figure 9:
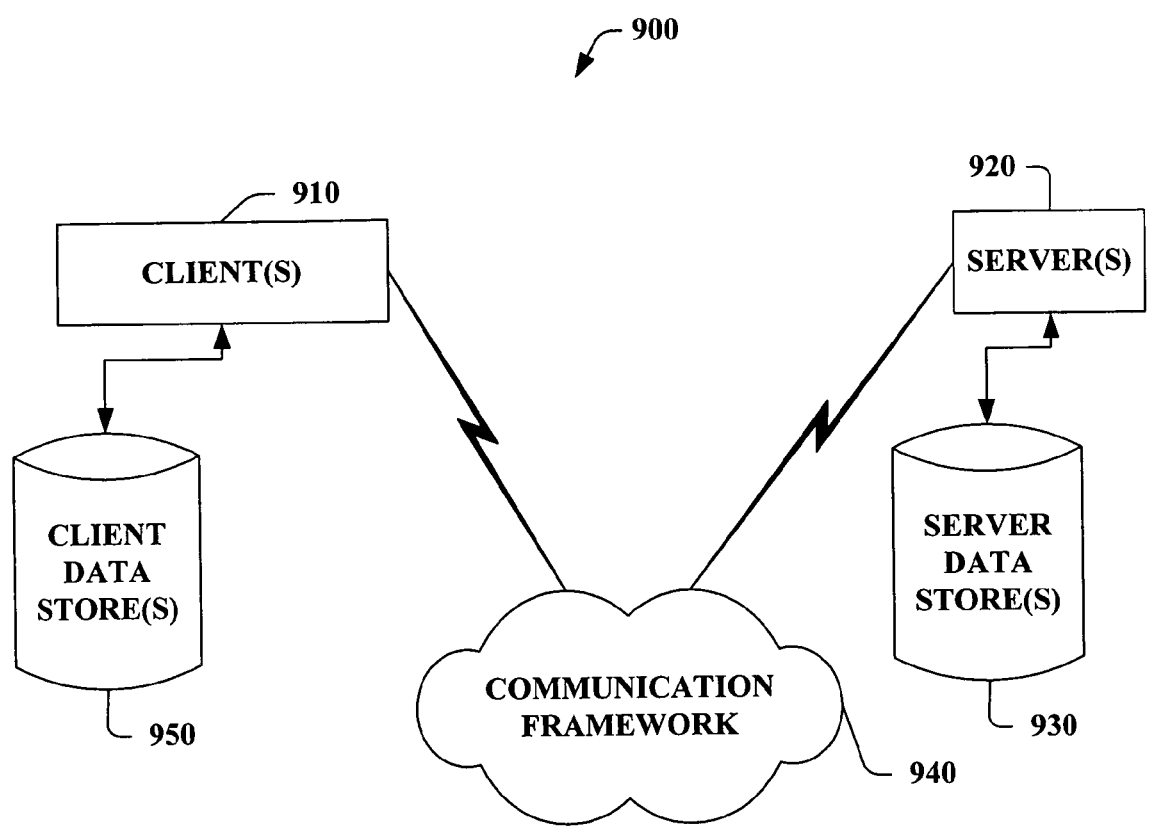
FIG. 9 illustrates an exemplary networking environment, wherein the novel aspects of the subject invention can be employed.
Figure 10:
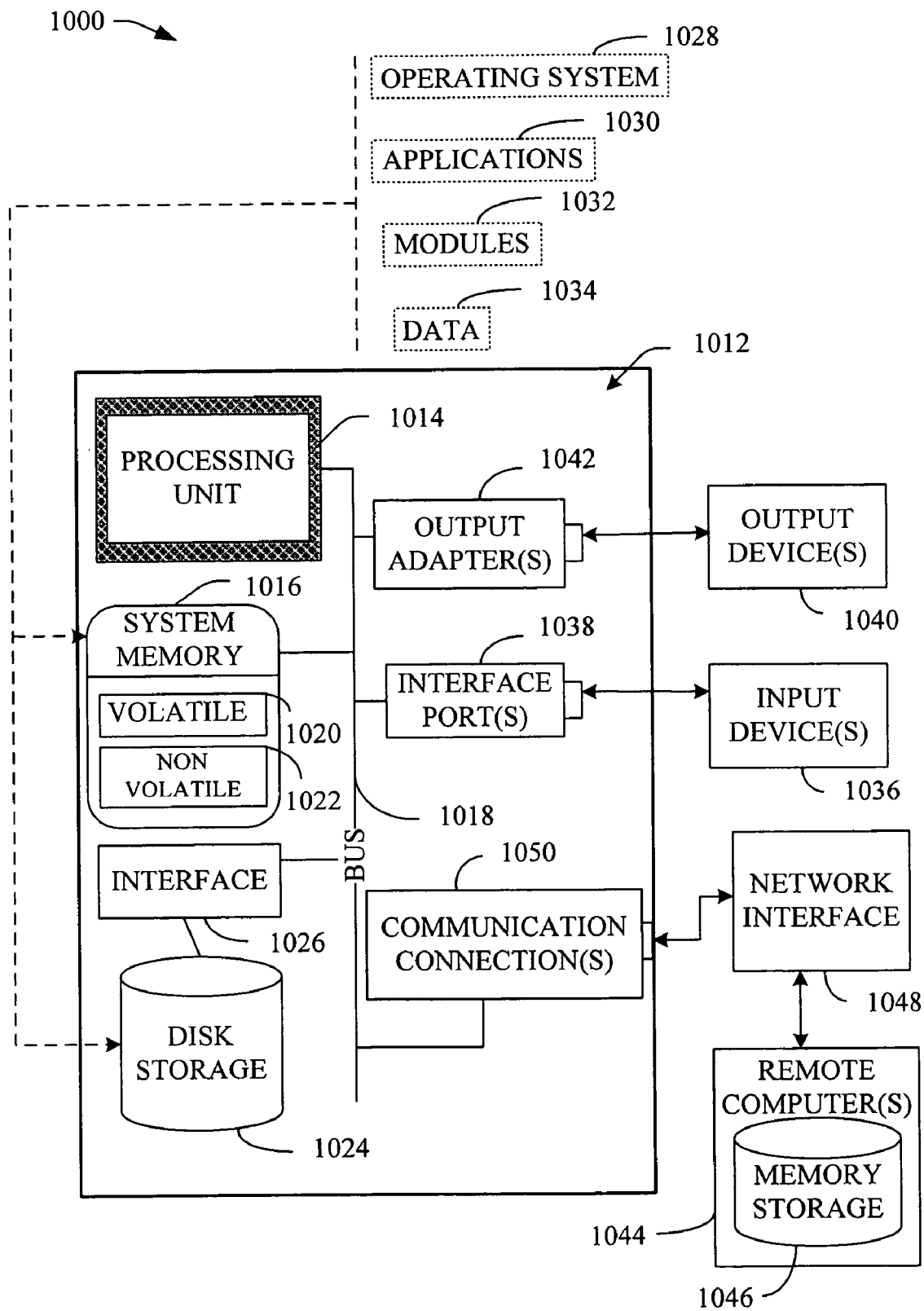
FIG. 10 illustrates an exemplary operating environment that can be employed in accordance with the subject invention.

In order to provide additional context for implementing various aspects of the subject invention, FIGS. 9-10 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 9 is a schematic block diagram of a sample-computing environment 900 with which the subject invention can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject invention, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 940.

With reference to FIG. 10, an exemplary environment 1000 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the subject invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

APPENDIX A

CHANGEDEFINITION CLASS DESCRIPTION

```
public class ChangeDefinition : PathComponent
{
   public ChangeDefinition(string treatAsType);
   public void Compile(out byte[ ] compiledDefinition)
}
public class AssignmentValueList : Inullable
{
   public AssignmentValueList( );
   public int Count { get;}
   public int Add(AssignmentValue value);
   public AssignmentValue this[int index];
   public void Clear( );
   }
public class UpdateNode : INullable
{
   public enum UpdateNodeType : short
      {
         ChangeDefinition,
         PathComponent,
         Assignment
      }
   public virtual UpdateNodeType NodeType { get; }
      public string PropertyName { get; }
}
public class PathComponent : UpdateNode
{
      public PathComponent AddPathComponent(string propertyName);
      public PathComponent AddPathComponent(string propertyName,
string treatAsType);
      public int AddAssignment(string propertyName,
AssignmentValue.AssignmentValueType valueType);
      public string TreatAsType { get; }
      public bool HasChildNodes { get; }
      public IEnumerator GetEnumerator( );
      public int ChildCount( ) { get;}
      public UpdateNode this[string propName] { get; set;}
}
public class Assignment : UpdateNode
{
   public int Index { get; }
   public AssignmentValue.AssignmentValueType ValueType { get; }
}
public class AssignmentValue
{
      public enum AssignmentValueType : short
      {
        None,
        Guid,
        Chars,
        Bytes,
        Boolean,
        Byte,
        Int16,
        Int32,
        Int64,
        Single,
        Double,
        Decimal,
        DateTime,
        NestedType,
        MultiSetProperty
      }
   public AssignmentValue( )
   {
   }
   virtual public AssignmentValue.AssignmentValueType Type { get; }
}
public class GuidValue : AssignmentValue
{
   public GuidValue( );
   public GuidValue(SqlGuid guidVal);
}
public class CharsValue : AssignmentValue
{
   public CharsValue( );
   public CharsValue(SqlChars charsVal);
}
```

APPENDIX A-continued

CHANGEDEFINITION CLASS DESCRIPTION

```
public class BytesValue : AssignmentValue
{
   public BytesValue( );
   public BytesValue(SqlBytes bytesVal);
}
public class BooleanValue : AssignmentValue
{
   public BooleanValue( );
   public BooleanValue(SqlBoolean booleanVal);
}
public class ByteValue : AssignmentValue
{
   public ByteValue( );
   public ByteValue(SqlByte byteVal);
}
public class Int16Value : AssignmentValue
{
   public Int16Value( );
   public Int16Value(SqlInt16 intVal);
}
public class Int32Value : AssignmentValue
{
   public Int32Value( );
   public Int32Value(SqlInt32 intVal);
}
public class Int64Value : AssignmentValue
{
   public Int64Value( );
   public Int64Value(SqlInt64 intVal);
}
public class SingleValue : AssignmentValue
{
   public SingleValue( );
   public SingleValue(SqlSingle singleVal);
}
public class DoubleValue : AssignmentValue
{
   public DoubleValue( );
   public DoubleValue(SqlDouble doubleVal);
}
public class DecimalValue : AssignmentValue
{
   public DecimalValue( );
   public DecimalValue(SqlDecimal decimalVal);
}
public class DateTimeValue : AssignmentValue
{
   public DateTimeValue( );
   public DateTimeValue(SqlDateTime dateTimeVal);
}
public class NestedTypeValue : AssignmentValue
{
   public NestedTypeValue( );
   public NestedTypeValue(NestedType nestedTypeVal);
}
public class MultiSetPropertyValue : AssignmentValue
{
   public MultiSetPropertyValue( );
   public MultiSetPropertyValue(MultiSetProperty2 multiSetPropVal);
   public MultiSetProperty2 MultiSetProperty {get; set;}
}
```

What is claimed is:

1. A system that facilitates creating a data structure to provide a granular data change, comprising:
   an interface that receives at least one data change input related to a target within hierarchical data;
   a change definition component that builds a data structure to provide a granular update to the target which is proportional to the data change input and compiles the data structure, wherein the data structure is a tree that includes 1) an assignment node that is a change to a property value represented by a leaf node, and 2) a traversal node that is a non-leaf node that represents a nested type that is a member of at least one of a top level property and a nested type property;

an unpack component that receives the compiled data structure and applies the data structure to an in-memory object;

translates a compiled data structure into a nested structured query language (SQL) update statement;

unpack unpacks a compiled data structure to allow the application of the granular change, wherein the unpack component targets a granular property related to the hierarchical data such that the cost of the data change operation is proportional to the amount of data change to be implemented;

an assignment component that utilizes an assignment value list to provide a value that corresponds to the data change input to be applied to the target within the hierarchical data; and a security component that employs a security technique and associates a user profile with a particular data change, the security technique is at least one of a login, a password, a biometric indicia, a voice recognition, and a security level associated with a user.

2. The system of claim 1, the hierarchical data is at least one of 1) extensible markup language (XML); 2) data relating to a data storage system that is a database-based system defining at least one of an item, a sub-item, a property, and a relationship to represent information as a complex type; and 3) at least one object within a database-based system with an associated property.

3. The system of claim 1, the granular update is an update to at least one of a granular property associated to the hierarchical data and a replacement of an entire nested object instance.

4. The system of claim 1, further comprising a tree component that analyzes a data change input and creates a corresponding data structure to represent the data change input with at least one of an assignment node and a traversal node.

5. The system of claim 1, further comprising a compile component that compiles the data structure to return a description of at least one property that is changed for the target in a format.

6. The system of claim 5, wherein the format is one of a binary format, a hexadecimal format, an octal format, and a decimal format.

7. The system of claim 1, the structure query language is a transact SQL (T-SQL) batch.

8. The system of claim 1, further comprising a verify component that can verify at least one of the following: a structural validity of the data structure; and a validity of a description of at least one of a property, a path, and a type.

9. The system of claim 8, further comprising a managed type catalogue that facilitates the verification of at least one of the structural validity and the description.

10. The system of claim 9, the managed type catalogue can be loaded from a cache table populated at schema installation utilizing a dictionary collection that can catalogue a type, a base type, a property, and a property type.

11. A computer readable medium having stored thereon the components of the system of claim 1.

* * * * *